United States Patent [19]
Heintz

[11] 3,908,935
[45] Sept. 30, 1975

[54] AIRCRAFT DUPLEX SYSTEM

[75] Inventor: Richard P. Heintz, Kalamazoo, Mich.

[73] Assignee: Pneumo Dynamics Corporation, Boston, Mass.

[22] Filed: Apr. 19, 1974

[21] Appl. No.: 462,250

[52] U.S. Cl.............. 244/83 E; 178/58 R; 318/657
[51] Int. Cl.².......................................... B64C 13/04
[58] Field of Search ............ 178/58 R; 179/2 DP, 3; 244/77 R, 77 F, 77 M, 77 V, 77 SE, 78, 83 E; 318/562, 584–586, 657; 340/199, 210, 310

[56] References Cited
UNITED STATES PATENTS

| | | | |
|---|---|---|---|
| 3,199,013 | 8/1965 | Brahm et al. | 318/657 X |
| 3,226,480 | 12/1965 | Wright et al. | 179/2 DP X |
| 3,328,527 | 6/1967 | Miles | 178/58 X |
| 3,626,283 | 12/1971 | James et al. | 318/657 X |

Primary Examiner—Trygve M. Blix
Assistant Examiner—Stephen G. Kunin
Attorney, Agent, or Firm—Donnelly, Maky, Renner & Otto

[57] ABSTRACT

A system for transmitting actuating and feedback signals between a control center and remote portions of an aircraft on common wires. Actuating signals for an electrohydraulic valve and feedback signals from a linear variable differential transformer monitoring operation of the valve, occur in substantially different frequency ranges and are transmitted simultaneously on the common wires, signal discrimination being accomplished by the use of series connected inductors and capacitors and by reliance on the impedance characteristics of the particular control components.

3 Claims, 2 Drawing Figures

U.S. Patent  Sept. 30, 1975  3,908,935
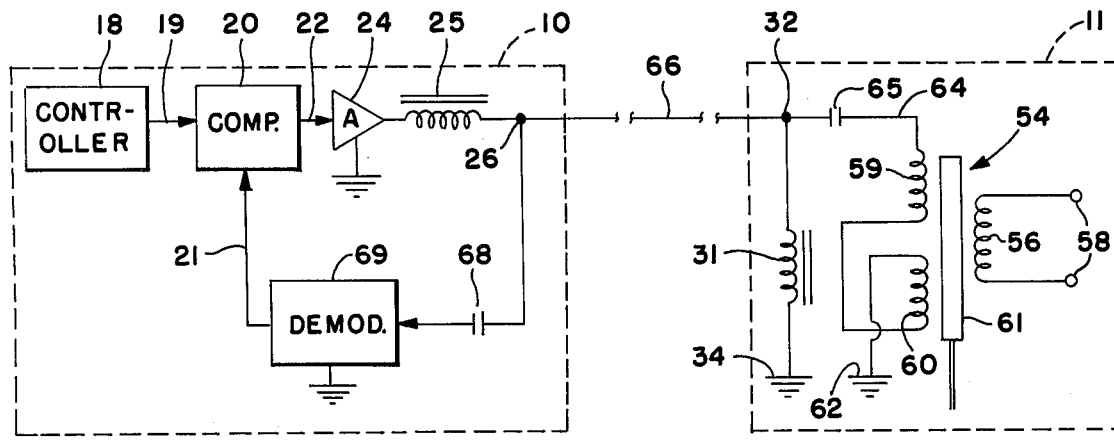
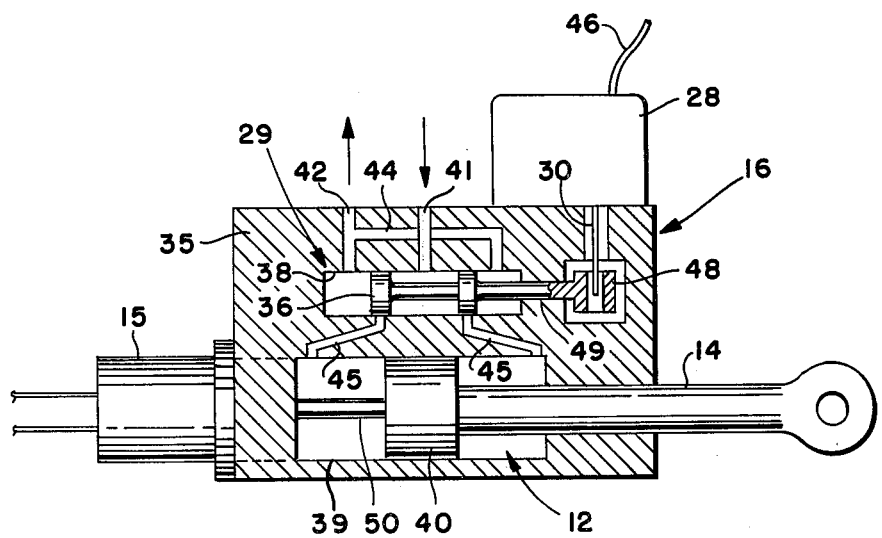

AIRCRAFT DUPLEX SYSTEM

This invention relates to control systems for vehicles and more particularly to a system for transmitting controlling and monitoring signals between various portions of an aircraft.

It is somewhat incongruous with the great attention that has been directed recently to reduction in size and weight of electronic and hydraulic components for actuating and controlling various portions of an aircraft, that greater attention has not been directed to the cable systems for transmitting electrical signals between such locations which in some instances is of greater weight and bulk than the control components themselves. This problem has been accentuated recently in the trend toward larger aircraft for achieving economy of operation, for here even greater lengths of runs of aircraft cable are required together with additional mechanisms for providing more exotic control.

Further, the great quantity of wiring encountered in a typical aircraft presents a significant problem as far as reliability is concerned. It is axiomatic that the greater the number of connecting lines and connecting terminals in a particular installation, the greater are the chances that faults will be encountered. In closed loop servo systems this is of even greater significance since it is possible, upon failure of the feedback loop, for example, that a "hardover" or uncontrollable condition will be effected. It would be desirable to have a system for remotely controlled components which is fail passive when discontinuities are encountered, at least in the interconnection portion of the system.

Therefore, it is a specific object of this invention to reduce the necessary number of cables within any vehicle installation by utilizing common lines for transmitting signals to and from various control components.

It is another object to provide a system of wiring especially for an aircraft control system which is more reliable than previous systems and which provides an economy of weight and bulk.

It is another object to provide an improved aircraft cable system which includes a fail safe feature for a particular application in the event of a fault in the wiring connections.

It is yet another object of this invention to provide improved apparatus for interconnecting a closed loop servo system comprising an electrohydraulic valve and a linear variable differential transformer located in an aircraft electronics bay and a remote control station.

These and other objects and advantages of the present invention will become apparent as the following description proceeds.

To the accomplishment of the foregoing and related ends, the invention, them comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIG. 1 is a diagram of the electrical components of this invention shown in schematic form and displaying their relative disposition in an aircraft.

FIG. 2 is an elevational view partly in cross section of the electrohydraulic valve, hydraulic motor and position transducer combination which forms the controlled component of this invention.

In FIG. 1, the electronics bay of an aircraft is represented by the block 10 shown in dashed lines and the control station, remotely located from the electronics bay, is indicated by the block 11 also shown in dashed lines. The electronics bay 10 typically comprises a number of components for controlling the various functions of the aircraft and usually is located near the pilot's compartment or close to a controller for ready access. On the other hand, the control station 11 is located at any one of various portions of the aircraft, usually at a great distance from the electronics bay 10 and associated with a controlled function such as, for example, the elevator mechanism in the tail section of the aircraft.

It will be understood that it is desirable not only to control such portion of the aircraft from the electronics bay 10 but also to receive some indication of the effect of the control function. While the latter information may be merely signalling information as in an open loop control system, more often such information is received as a part of the feedback loop of a closed loop system.

In such closed loop system, it is usual to provide separate cables between the electronics bay 10 and the control station 11 for commanding the control function and for receiving indications of the performance of same. Such signals typically occur at different frequencies and, optimally, a continuous system must be maintained in order to prevent erratic operation of the control device. As noted, in some instances such connecting cabling must run substantially the full length of the aircraft and does result in an appreciable weight load which must be taken into account in determining the operating characteristics and airworthiness of the aircraft.

There are usually a plurality of similar control stations dispersed throughout an aircraft and connected with the electronics bay 10. Further each control station may comprise a plurality of components, similar to the single grouping depicted in FIG. 1, which control plural functions of the aircraft at that station and which require a correspondingly greater number of interconnecting cables.

It will be clear also that although the preferred embodiment of this invention is depicted with relation to an aircraft, the teachings of the invention are applicable as well to any other type of vehicle or control installation. Thus, the electronics bay 10 and control station 11 may correspond to any other system having physically separated components where signals are to be transmitted over an appreciable distance.

In this embodiment of the invention, the system shown comprises a hydraulic motor 12 having an output shaft 14 for actuating a portion of the aircraft, a linear position transducer 15 for monitoring the operation of the hydraulic motor 12, an electrohydraulic valve 16 for controlling flow of fluid to the hydraulic motor 12 and electronic components and modules located primarily in the electronics bay 10, for directing a command signal to the hydraulic motor 12 and for combining a feedback signal in a closed loop operating system. In FIG. 1 all system components are shown in block diagram form or in the usual electronic symbolic representation and although an actual electronics bay of an aircraft contains many other components and the complete aircraft system comprises many multiples of such control systems, such limited showing will be sufficient to gain an appreciation of the principles of this invention.

In the electronics bay 10, a block labeled controller 18 is indicated for providing a command signal to the control system and in this instance may comprise a manually operated device which provides an electrical output signal on line 19 determinative of the desired degree of actuation of the controlled device (not shown) coupled to the output shaft 14 of the hydraulic motor 12. Such signal is applied to a comparer circuit 20 which is a form of difference amplifier responsive to such input signal and a feedback signal realized on line 21 for providing an error signal on line 22 to the control system. The error signal is typically applied to a power amplifier 24 and thereafter to a series connected choke 25 and appears at the output terminal 26 of the electronics bay 10 as a signal in the frequency range of from DC to approximately 20 Hz, suitable for control of the electrohydraulic valve 16.

In the control station of the electrohydraulic valve 16 comprises primarily a torque motor 28 and a servo valve 29 mechanically coupled to the torque motor 28 by the torque motor output actuator rod 30. In FIG. 1 the torque motor 28 is represented as an iron core inductance 31 and for purposes of this description the characteristics of the torque motor 28 may be considered similar to such inductance 31 although the actual operating characteristics may vary somewhat as well known in the art. The torque motor 31 is connected at one end to the input terminal 32 of the control station 11 and at the other end to ground 34.

The usual symbol for ground 34 will be used throughout this specification as an indication of a common line of potential for the control system. In actual practice such ground 31 may comprise the framework of the aircraft with connections made at convenient locations for the components involved, or may constitute a separate cable connected between the electronics bay 10 and the control station 11 as a return line for circuit completion.

In this embodiment of the invention the servo valve 29 and the hydraulic motor 12 are combined in a common body casting 35, the former comprising a spool 36 slidable in a bore 38 in the upper portion of the casting 35 to control the flow of fluid to and the actuation of the hydraulic motor 12. The hydraulic motor 12 in turn comprises a bore 39 in the lower portion of the casting 35 forming a cylinder in which a piston 40 is slidable, under the influence of fluid as directed by the electrohydraulic valve 16, to various positions within the cylinder. The piston 40 is connected directly to the output actuator rod 14 which extends externally of the casting 35, for transmission of the motion to an output utilization device such as the elevator mechanism of an aircraft previously mentioned. A pressure port 41 and a return port 42 are provided in the valve body 35 for coupling to a source of fluid pressure available within the aircraft and suitable conduits 44 connect the ports to the bore 38 of the servo valve 29 and further conduits 45 connect the valve with the bore 39 of the hydraulic motor 12.

Also mounted on the valve casting 35 is the torque motor 28 which comprises a conventional electromagnetic actuator for providing an output movement in response to an applied input signal at connection wires 46. Actuation of the torque motor 28 is evidenced as a pivoting movement of the actuator rod 30, the tip of which is entrapped in a connector 48 mounted on an arm 49 extending from the spool 36 of the servo valve 29. Movement of the actuator rod 30 in response to an applied electrical signal thus causes a repositioning of the spool 36 from that depicted in FIG. 2 to a position whereby fluid under pressure may be directed to one or the other side of the piston 40 for movement of the output actuator rod 14.

Further mounted on the valve casting 35 is the transducer 15 for monitoring position of the output actuator rod 14 which in this instance is an LVDT (linear variable differential transformer). The LVDT is a device well known to those skilled in this art comprising generally a transformer of extended length having a central movable core therein for varying the coupling between primary and secondary windings of the transformer. The output windings of the transformer are arranged to provide a unique output voltage for each position of the core and thus, in this instance, provide a means for monitoring movement or discrete positions of the output actuator shaft 14 which is directly coupled to the movable core of the LVDT by an extension rod 50 affixed to the piston 40 of the hydraulic motor 12. The body of the transducer 15 is adapted to be mounted in the bore 39 so as to form the end wall for the cylinder of the hydraulic motor 12.

In FIG. 1, the LVDT 54 is depicted schematically as a device having a primary winding 56 connected to receive an energizing signal at input terminals 58, such energizing signal being available from an oscillator source within the aircraft. A pair of secondary windings 59, 60 are provided which are magnetically coupled to the primary winding 56 through the intermediary of the central movable core 61 and are serially connected in opposite phase from a ground connection 62 to provide an output signal on line 64. The energizing signal is of constant amplitude having a frequency of 1800 Hz and the output signal appearing on line 64 is also of the same frequency. Line 64 is connected to terminal 32 by way of capacitor 65 such that both the energizing signals for the electrohydraulic valve 16 and the feedback signals from the LVDT 54 representative of actuator rod 14 position appear simultaneously at terminal 32 of the control station 11.

Terminal 26 of the electronics bay 10 and terminal 32 of the control station 11 are interconnected by a single wire cable 66 of suitable length for transmitting signals therebetween and it is significant that only a single cable is required for completion of the control circuit.

As noted in FIG. 1, terminal 26 is further connected by way of a fixed capacitor 68 to a demodulator circuit 69 which supplies the position signal on line 21 for application to the comparer 20. The demodulator 69 may be any one of many well known circuits of this type requiring only a conversion of the relatively high frequency feedback signal on line 66 to a signal on line 21 compatible with that supplied from the controller 18 on line 19.

As is well known, the choke 25 presents a relatively high impedance to a high frequency signal while capacitors 65, 68 present a low impedance, thereby acting as filters and establishing a circuit for the feedback signal from the LVDT output on line 64, through capacitor 65, connecting cable 66, capacitor 68, and demodulator circuit 69 for application to the comparer 20. The high impedance characteristic of the choke 25 and the electrohydraulic valve 31 assure that little or no effect due to this signal occurs at the amplifier 24 or the hydraulic motor 12.

Similarly, the low frequency command signal emanating from the amplifier 24 finds a low impedance path through the choke 25, connecting cable 66 and the electrohydraulic valve 31, while being deterred from reaching the demodulator 69 or the LVDT 54 by the fixed capacitors 68, 65 respectively. In this embodiment of the invention, the inductive characteristic of the torque motor 28, inherently produces the low pass filter depicted by inductance 31 so that additional components are not required; however, it is obvious that an inductor connected between terminal 32 and some other type of component in place of the torque motor 28 would similarly restrict a high frequency signal while allowing the application of a low frequency control signal.

Further, it is to be noted that a self-checking form of circuitry is provided by the connection of components shown in that since only a single cable 66 connects the electronics bay 10 and the control station 11, and transmits the command information as well as the feedback signals, the circuitry is either completely operative or completely inoperative in the event of a fault in the cable 66. As a comparison, in the usual system command and feedback signals are transmitted over separate cables and in the event of a failure in one of the cables an open loop condition could occur whereby the servo valve or other controlled component would be actuated to a full on or hard-over state creating a dangerous condition particularly in an aircraft. Such partial loss of signal is unattainable due to cable fault in the apparatus of the instant invention and it is clear that in modifications of this invention, the spool 36 of the servo valve 29 or even the output shaft 14 of the hydraulic motor 12 could be biased by a spring arrangement or the like to reset to a neutral condition in the event of the loss of an actuating signal. In this embodiment, actuator rod 30 of the torque motor 28 is normally biased to neutral to return spool 36 to neutral also in the event of loss of a command signal.

Further, the configuration of the instant invention is advantageous in locating active components such as the amplifier 24 and the demodulator 69 in the electronics bay 10 of the aircraft where ambient conditions are much more favorable, while only passive electronic components are required in the remotely located control station 11 which is subject to extremes of temperature. In this regard, capacitor 65 should be selected so as to be capable of a reliable operation under these extreme environmental conditions and preferably such capacitor 65 is of the ceramic type. It is obvious that the values of the components such as the choke 25 and capacitors 65, 68 be selected to present suitable impedance characteristics at the aforementioned frequencies of operation. In this example, significant frequency difference is presented in the electrohydraulic valve 16 actuating frequency and that of the LVDT 54 so that suitable high and low pass filter arrangements provided by the choke 25 and capacitors 65, 68 is readily attainable. Numerous other frequency combinations are compatible in a system of this type and it is only necessary to select frequencies of operation and values of components for preventing cross talk of the signals and sufficient discrimination of the same for application to the respective components.

I therefore, particularly point out and distinctly claim as my invention:

1. A system for interconnecting the various portions of an aircraft actuator, comprising means for generating a command signal proportional to the desired movement of a portion of the aircraft, means for comparing the command signal with a feedback signal indicative of actual movement of the portion of the aircraft and for developing an error signal occurring in a low frequency range, an inductor connected to receive the error signal and apply same to a first terminal located in the electronics bay of an aircraft, an electrohydraulic valve remotely located in a control station of the aircraft and connected to a second terminal in the control station, a feedback device for monitoring said electrohydraulic valve located in the control station, said feedback device adapted to provide a relatively high frequency output signal, a capacitor connected between said feedback device and the second terminal, a single wire connecting said first and second terminals, a demodulator in the electronics bay of the aircraft for converting the high frequency feedback signal to a signal compatible with the command signal, and a second capacitor connected between said demodulator and the first terminal for completion of the circuit.

2. A system as set forth in claim 1 wherein said electrohydraulic valve comprises a torque motor of relatively high inductance and a hydraulic valve coupled thereto for control of an output device, said feedback device being coupled to the output device for monitoring the instantaneous position of same.

3. A system as set forth in claim 2 wherein said feedback device comprises a linear variable differential transformer having a movable core coupled to said output device, said transformer being energized at a frequency substantially higher than the frequency range of the command signal.

* * * * *